US011792684B2

(12) United States Patent
Liu et al.

(10) Patent No.: US 11,792,684 B2
(45) Date of Patent: Oct. 17, 2023

(54) METHODS AND APPARATUSES FOR SIGNAL PROCESSING AT BASE STATION

(71) Applicant: Telefonaktiebolaget LM Ericsson (publ), Stockholm (SE)

(72) Inventors: Peng Liu, Beijing (CN); Ming Li, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 382 days.

(21) Appl. No.: 17/311,025

(22) PCT Filed: Dec. 6, 2018

(86) PCT No.: PCT/CN2018/119532

§ 371 (c)(1),
(2) Date: Jun. 4, 2021

(87) PCT Pub. No.: WO2020/113512

PCT Pub. Date: Jun. 11, 2020

(65) Prior Publication Data

US 2022/0022096 A1 Jan. 20, 2022

(51) Int. Cl.

| | |
|---|---|
| ***H04W 28/06*** | (2009.01) |
| ***H04L 27/26*** | (2006.01) |
| ***H04W 28/02*** | (2009.01) |
| ***H04W 52/36*** | (2009.01) |

(52) U.S. Cl.

CPC ......... *H04W 28/06* (2013.01); *H04L 27/2623* (2013.01); *H04W 28/0236* (2013.01); *H04W 52/367* (2013.01)

(58) Field of Classification Search

CPC ........... H04W 52/367; H04W 28/0236; H04W 28/06; H04L 27/2623

See application file for complete search history.

(56) References Cited

U.S. PATENT DOCUMENTS

| | | | | |
|---|---|---|---|---|
| 9,337,782 | B1 | 5/2016 | Mauer et al. | |
| 2011/0134972 | A1 | 6/2011 | Zhu et al. | |
| 2012/0207206 | A1* | 8/2012 | Samardzija ............. | H03M 7/30 375/240 |
| 2012/0321014 | A1 | 12/2012 | Maehata et al. | |
| 2015/0049843 | A1 | 2/2015 | Reuven et al. | |

OTHER PUBLICATIONS

International Search Report and Written Opinion for International Patent Application No. PCT/CN2018/119532, dated Sep. 5, 2019, 9 pages.

* cited by examiner

*Primary Examiner* — Elton Williams

(74) *Attorney, Agent, or Firm* — Withrow & Terranova, PLLC

(57) ABSTRACT

Methods and apparatuses for signal processing at base station are disclosed. According to an embodiment, a digital unit (DU) compresses a block of baseband signal samples. The DU determines whether valley increment is to be applied on decompressed block of baseband signal samples by a radio unit (RU) connected with the DU, based on the compressed block. When determining that valley increment is not to be applied, the DU generates an indication for indicating not to apply valley increment. When determining that valley increment is to be applied, the DU determines information related to bit loss due to the compression. The DU sends, to the RU, the compressed block and the indication or the information related to bit loss.

12 Claims, 8 Drawing Sheets

Original bits

Compression, LB loss

CFR and valley increment, Joint LB and HB loss

Bits after compression and CFR

Final dynamic range limited

METHODS AND APPARATUSES FOR SIGNAL PROCESSING AT BASE STATION

This application is a 35 U.S.C. § 371 national phase filing of International Application No. PCT/CN2018/119532, filed Dec. 6, 2018, the disclosure of which is incorporated herein by reference in its entirety.

TECHNICAL FIELD

Embodiments of the disclosure generally relate to wireless communication, and, more particularly, to methods and apparatuses for signal processing at base station.

BACKGROUND

This section introduces aspects that may facilitate better understanding of the present disclosure. Accordingly, the statements of this section are to be read in this light and are not to be understood as admissions about what is in the prior art or what is not in the prior art.

Front haul (FH) refers to the connection between a digital baseband unit and a remote radio unit of a base station. FIG. 1 shows the overview of common public radio interface (CPRI) protocol, which is a typical standard for front haul. As shown, CPRI defines three different logical connections between the digital unit (DU) and the radio unit (RU): user plane data, control and management (C&M) plane, and synchronization and timing. The user plane data is transported in the form of one or multiple in-phase and quadrature (IQ) data streams. Each IQ data flow reflects the radio signal, sampled and digitized, of one carrier at one independent antenna element, the so-called antenna carrier (AxC). The port "M" of the DU refers to master and the port "S" of the RU refers to slave. The IQ data is transmitted between the antenna element and the terminal device on downlink (DL) or uplink (UL).

The recommended compression schemes for CPRI are specified for both DL and UL based on block floating point (BFP) data format. Take 20 bits sample formats as examples. The potential DL formats may be expressed as: 2×10 bit where the corresponding signal-to-quantization-noise ratio (SQNR) is 47.0 dB; and 2×9+2 bit where the corresponding SQNR is 53.3 dB. The potential UL formats may be expressed as: 2×8+4 bit where the corresponding SQNR is 47.4 dB; and 4×9+4 bit where the corresponding SQNR is 51.7 dB. In the above expressions of the formats, N×M+E means N (I or Q) values with M bit mantissa sharing E bit exponent. The DL SQNR is given for $\sigma$=2914 scaled by the dynamic range relative to 2×15 format, where a is standard deviation. The impact of the compression on the SQNR is shown in FIG. 2 where the term "AWGN" means additive white Gaussian noise.

FIG. 3 shows the existing signal processing flow at a base station. As shown, the baseband signal is compressed at the DU. Then, the compressed baseband signal is sent to the RU through CPRI. The compressed baseband signal is decompressed at the RU. Then, the decompressed baseband signal undergoes upsampling, crest factor reduction (CFR) and further DL processing. The purpose of the CFR is to keep the signal dynamic range in a proper range for further processing, such as power amplifier transmission. Take theoretical simplest CFR as an example. The amplitude of an original signal x(t) is: $A=|x(t)|$. The amplitude A is compared with a high-threshold (H-TH). If A<H-TH, then the output signal $y(t)=x(t)$. If A≥H-TH, then the output signal $y(t)=TH_H \cdot \exp(j\angle x(t))$, where $TH_H$ is the H-TH. The output signal passes through a filter F{•}, in order to suppress frequency side lobe to get $z(t)=F\{y(t)\}$.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for signal processing at base station.

According to one aspect of the disclosure, there is provided a method implemented at a DU. The method comprises compressing a block of baseband signal samples. The method further comprises determining whether valley increment is to be applied on decompressed block of baseband signal samples by a RU connected with the DU, based on the compressed block. The method further comprises, when determining that valley increment is not to be applied, generating an indication for indicating not to apply valley increment. The method further comprises, when determining that valley increment is to be applied, determining information related to bit loss due to the compression. The method further comprises sending, to the RU, the compressed block and the indication or the information related to bit loss.

In an embodiment of the disclosure, the determining whether valley increment is to be applied comprises comparing a maximum power of the compressed block with a predetermined first power threshold. The determining whether valley increment is to be applied further comprises, when the maximum power is smaller than or equal to the predetermined first power threshold, determining that valley increment is not to be applied. The determining whether valley increment is to be applied further comprises, when the maximum power is greater than the predetermined first power threshold, determining that valley increment is to be applied.

In an embodiment of the disclosure, the information related to bit loss is determined as: a number of lost bits due to the compression, or a signal power corresponding to the number of lost bits.

In an embodiment of the disclosure, the compressed block and the indication or the information related to bit loss are sent in a format based on CPRI.

According to another aspect of the disclosure, there is provided a method implemented at a RU. The method comprises receiving a compressed block of baseband signal samples and related control information from a DU connected with the RU. The method further comprises decompressing the compressed block. The method further comprises, when the related control information includes an indication for indicating not to apply valley increment, applying CFR on the decompressed block. The method further comprises, when the related control information includes information related to bit loss due to compression by the DU, applying both valley increment and CFR on the decompressed block. The valley increment is applied based on the information related to bit loss.

In an embodiment of the disclosure, the information related to bit loss is a number of lost bits due to the compression. The valley increment is applied by determining a signal power corresponding to the number of lost bits and using the signal power as a second power threshold for the valley increment.

In an embodiment of the disclosure, the information related to bit loss is a signal power corresponding to a number of lost bits due to the compression. The valley increment is applied by using the signal power as a second power threshold for the valley increment.

In an embodiment of the disclosure, the compressed block and the related control information are received in a format based on CPRI.

According to another aspect of the disclosure, there is provided a DU. The DU comprises a compressor configured to compress a block of baseband signal samples. The DU further comprises a first determiner configured to determine whether valley increment is to be applied on decompressed block of baseband signal samples by a RU connected with the DU, based on the compressed block. The DU further comprises an indication generator configured to, when the first determiner determines that valley increment is not to be applied, generate an indication for indicating not to apply valley increment. The DU further comprises a second determiner configured to, when the first determiner determines that valley increment is to be applied, determine information related to bit loss due to the compression. The DU further comprises a sender configured to send, to the RU, the compressed block and the indication or the information related to bit loss.

In an embodiment of the disclosure, the first determiner is configured to determine whether valley increment is to be applied by comparing a maximum power of the compressed block with a predetermined first power threshold. The first determiner is configured to determine whether valley increment is to be applied by determining that valley increment is not to be applied when the maximum power is smaller than or equal to the predetermined first power threshold. The first determiner is configured to determine whether valley increment is to be applied by determining that valley increment is to be applied when the maximum power is greater than the predetermined first power threshold.

In an embodiment of the disclosure, the second determiner is configured to determine the information related to bit loss as: a number of lost bits due to the compression, or a signal power corresponding to the number of lost bits.

In an embodiment of the disclosure, the sender is configured to send the compressed block and the indication or the information related to bit loss in a format based on CPRI.

According to another aspect of the disclosure, there is provided a RU. The RU comprises a receiver configured to receive a compressed block of baseband signal samples and related control information from a DU connected with the RU. The RU further comprises a decompressor configured to decompress the compressed block. The RU further comprises a clipper configured to apply CFR on the decompressed block when the related control information includes an indication for indicating not to apply valley increment, and to apply both valley increment and CFR on the decompressed block when the related control information includes information related to bit loss due to compression by the DU. The valley increment is applied based on the information related to bit loss.

In an embodiment of the disclosure, the information related to bit loss is a number of lost bits due to the compression. The clipper is configured to apply the valley increment by determining a signal power corresponding to the number of lost bits and using the signal power as a second power threshold for the valley increment.

In an embodiment of the disclosure, the information related to bit loss is a signal power corresponding to a number of lost bits due to the compression. The clipper is configured to apply the valley increment by using the signal power as a second power threshold for the valley increment.

In an embodiment of the disclosure, the receiver is configured to receive the compressed block and the related control information in a format based on CPRI.

According to another aspect of the disclosure, there is provided a DU. The DU comprises at least one processor and at least one memory. The at least one memory contains instructions executable by the at least one processor, whereby the DU is operative to compress a block of baseband signal samples. The DU is further operative to determine whether valley increment is to be applied on decompressed block of baseband signal samples by a RU connected with the DU, based on the compressed block. The DU is further operative to, when determining that valley increment is not to be applied, generate an indication for indicating not to apply valley increment. The DU is further operative to, when determining that valley increment is to be applied, determine information related to bit loss due to the compression. The DU is further operative to send, to the RU, the compressed block and the indication or the information related to bit loss.

In an embodiment of the disclosure, the DU is operative to perform the method according to the above aspect.

According to another aspect of the disclosure, there is provided a RU. The RU comprises at least one processor and at least one memory. The at least one memory contains instructions executable by the at least one processor, whereby the RU is operative to receive a compressed block of baseband signal samples and related control information from a DU connected with the RU. The RU is further operative to decompress the compressed block. The RU is further operative to, when the related control information includes an indication for indicating not to apply valley increment, apply CFR on the decompressed block. The RU is further operative to, when the related control information includes information related to bit loss due to compression by the DU, apply both valley increment and CFR on the decompressed block. The valley increment is applied based on the information related to bit loss.

In an embodiment of the disclosure, the RU is operative to perform the method according to the above aspect.

According to another aspect of the disclosure, there is provided a base station. The base station comprises a DU according to the above aspect and a RU according to the above aspect.

According to another aspect of the disclosure, there is provided a computer program product. The computer program product comprises instructions which when executed by at least one processor, cause the at least one processor to perform the method according to the above aspect.

According to another aspect of the disclosure, there is provided a computer readable storage medium. The computer readable storage medium comprises instructions which when executed by at least one processor, cause the at least one processor to perform the method according to the above aspect.

According to some embodiment(s) of the disclosure, the degradation of signal quality due to compression and clipping can be reduced.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 1:
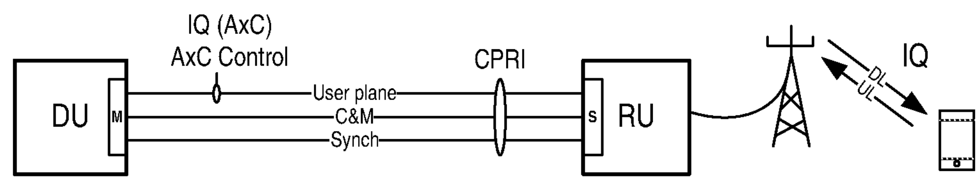
FIG. 1 is a diagram showing the overview of CPRI.
Figure 2:
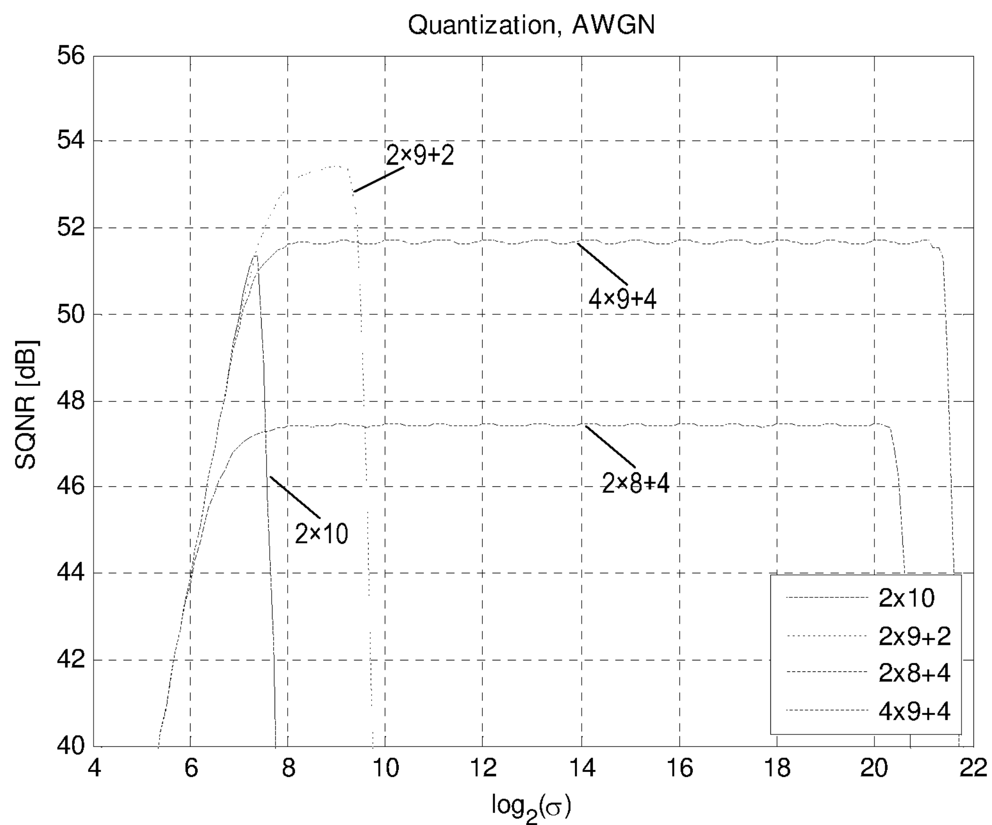
FIG. 2 shows the impact of compression on SQNR.
Figure 3:
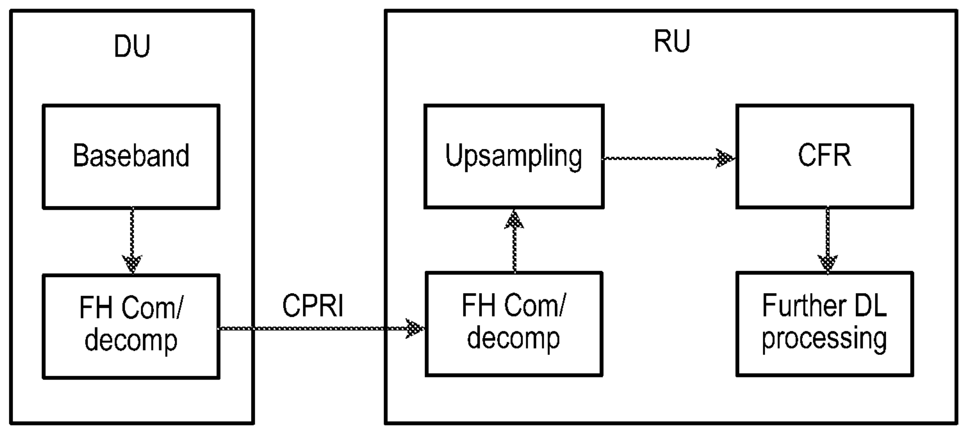
FIG. 3 is a diagram showing the existing signal processing flow at a base station.
Figure 4:
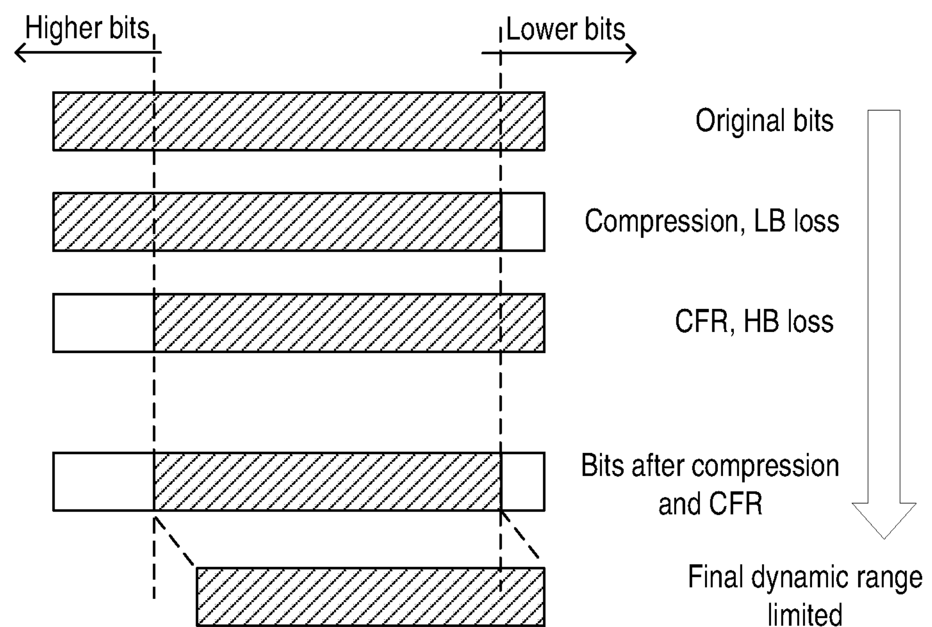
FIG. 4 shows the impact of compression and CFR on dynamic range in the prior art.

On downlink whose signal-to-noise ratio (SNR)/SQNR is more sensitive to the signal quality or error vector magnitude (EVM) in transmitted signal, CPRI compression and CFR are two major contributors to the signal quality. With CPRI compression and consequent CFR, the finally resulting signal quality is shown in FIG. 4. For the original data, CPRI compression is done, with LB bits loss/distortion. Then, CFR causes HB bits loss/distortion. For example, suppose the EVM due to CPRI=A % and the EVM due to CFR=B %. Then the accumulative EVM=SQRT($A^2$+$B^2$) % where SQRT(x) refers to the square root of x. Apparently, the final result after CPRI and CFR has to suffer the signal quality degradations inherently. So, it would be desirable to avoid the EVM accumulation from CPRI and CFR. If it can be avoided, that means the signal can be compressed and clipped more without signal quality degradation.

The present disclosure proposes an improved solution for signal processing at base station. The basic idea is to coherent loss/distortion partly between compression and clipping by joint-operation of compression and clipping. Hereinafter, the solution will be described in detail with reference to FIGS. 5-15.

Figure 5:
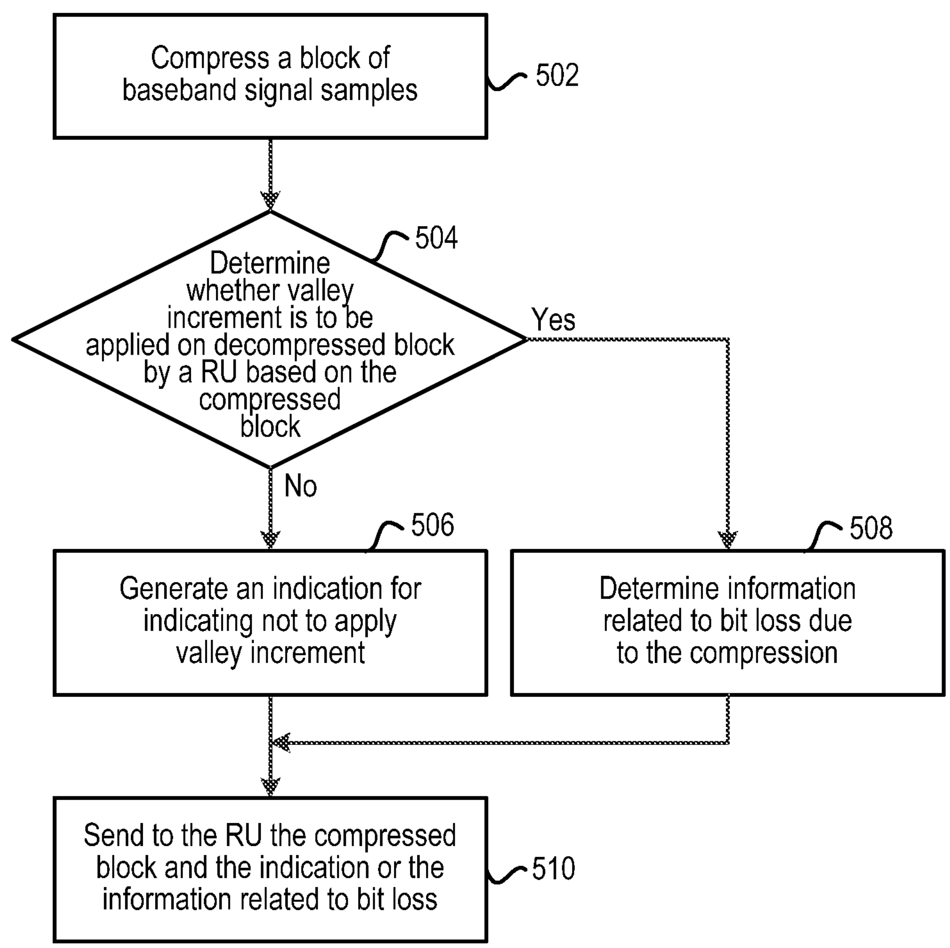
FIG. 5 is a flowchart illustrating a method implemented at a DU according to an embodiment of the disclosure.

FIG. 5 is a flowchart illustrating a method implemented at a DU according to an embodiment of the disclosure. At block 502, a block of baseband signal samples is compressed. For example, the baseband signal samples may be generated by a signal generator of the DU. N consecutive baseband signal samples (N is an integer greater than one) may constitute a block and the baseband signal samples may be compressed block by block. Note that the present disclosure is not limited in what compression technique is used at block 502. At block 504, the DU determines whether valley increment is to be applied on decompressed block of baseband signal samples by a RU connected with the DU, based on the compressed block. For example, the RU may be connected with the DU by an optical cable and decompress the compressed block received from the DU.

The valley increment is a clipping technique introduced in consideration that only CFR is conventionally implemented on the original input signal to decrease the peak of the signal, which goes deep into the power amplifier (PA) saturation region and results in poor compensation performance of nonlinearity. For example, the valley increment may proceed as follows. The amplitude of an original signal x(t) is A=|x(t)|. The amplitude A is compared with a low-threshold (L-TH). If the amplitude is less than the low-threshold (i.e. A<L-TH), then the signal amplitude is set to the low-threshold and the phase information is reserved. That is, the output signal can be expressed as: $y(t)=TH_L \cdot \exp(j\angle x(t))$, where $TH_L$ is the L-TH. Otherwise (i.e. A≥L-TH), the output signal is equal to the input signal, that is, y(t)=x(t). Then the output signal passes through a filter $F\{\bullet\}$ to restrain the side lobe, which can be expressed as: $z(t)=F\{y(t)\}$.

Figure 6:
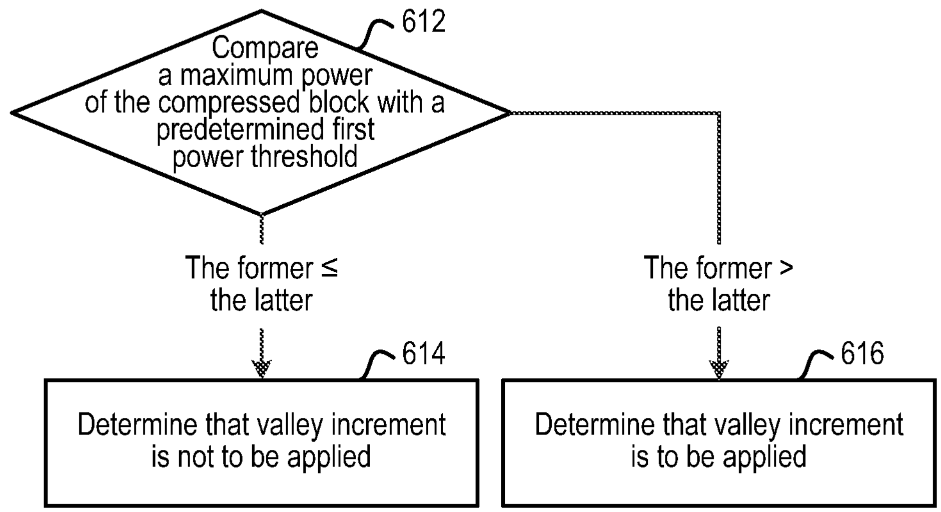
FIG. 6 is a flowchart for explaining the method of FIG. 5.

For example, block 504 may be implemented as blocks 612-616 of FIG. 6. At block 612, a maximum power of the compressed block is compared with a predetermined first power threshold. Since the compressed block is constituted by multiple compressed baseband signal samples each of which has a corresponding power value, the power values of these signal samples define the dynamic range of the compressed block. The largest one among these power values may be determined as the maximum power of the compressed block. The high threshold for CFR may be used as the first power threshold. If the maximum power is smaller than or equal to the predetermined first power threshold, the DU determines, at block 614, that valley increment is not to be applied. On the other hand, if the maximum power is greater than the predetermined first power threshold, the DU determines, at block 616, that valley increment is to be applied.

When determining that valley increment is not to be applied, the DU generates, at block 506, an indication for indicating not to apply valley increment. As a simplest example, a single bit may be used to indicate whether to apply valley increment. When the single bit takes the value of zero, it indicates not to apply valley increment. When the single bit takes the value of one, it indicates to apply valley increment. Note that the indication may take any other form as long as the RU can know whether to apply valley increment according to the indication.

When determining that valley increment is to be applied, the DU determines, at block 508, information related to bit loss due to the compression. As an option, the information related to bit loss may be the number of lost bits due to the compression. In this way, the RU may determine a signal power corresponding to the number of lost bits and use the signal power as the low threshold for valley increment. As another option, the information related to bit loss may be the signal power corresponding to the number of lost bits. In this way, the RU may simply use the signal power as the low threshold for valley increment. At block 510, the DU sends, to the RU, the compressed block and the indication or the information related to bit loss. For example, the compressed block and the indication or the information related to bit loss may be sent in a format based on CPRI.

Figure 7:
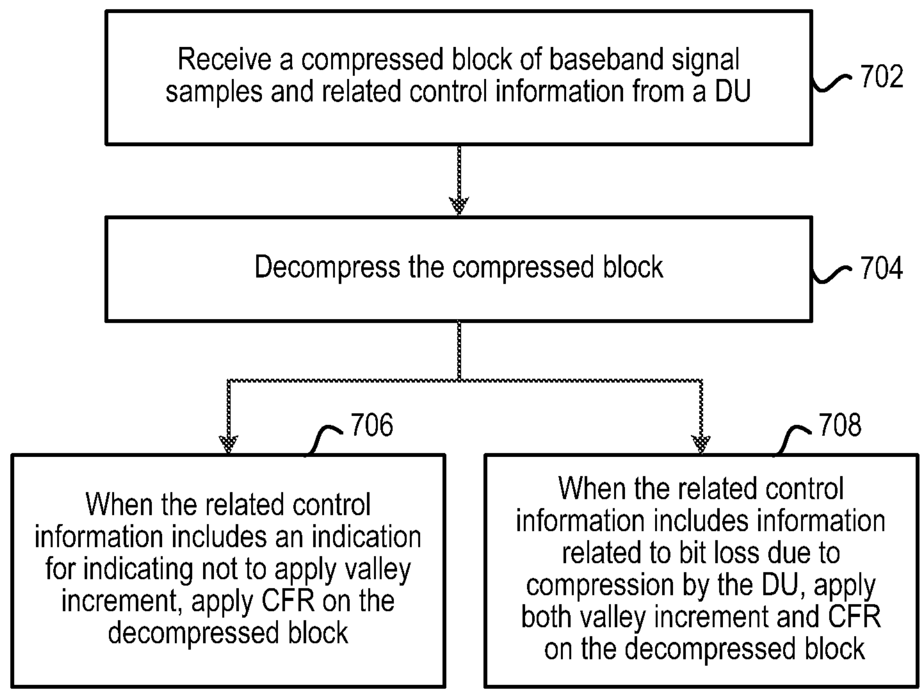
FIG. 7 is a flowchart illustrating a method implemented at a RU according to an embodiment of the disclosure.

FIG. 7 is a flowchart illustrating a method implemented at a RU according to an embodiment of the disclosure. At block 702, the RU receives a compressed block of baseband signal samples and related control information from a DU connected with the RU. For example, correspondingly to block 510, the compressed block of baseband signal samples and the related control information may be received in a format based on CPRI. The related control information may include an indication for indicating not to apply valley increment, or information related to bit loss due to compression by the DU. At block 704, the compressed block is decompressed. This may be performed by using the decompression technique corresponding to the compression technique used at block 502.

Figure 8:
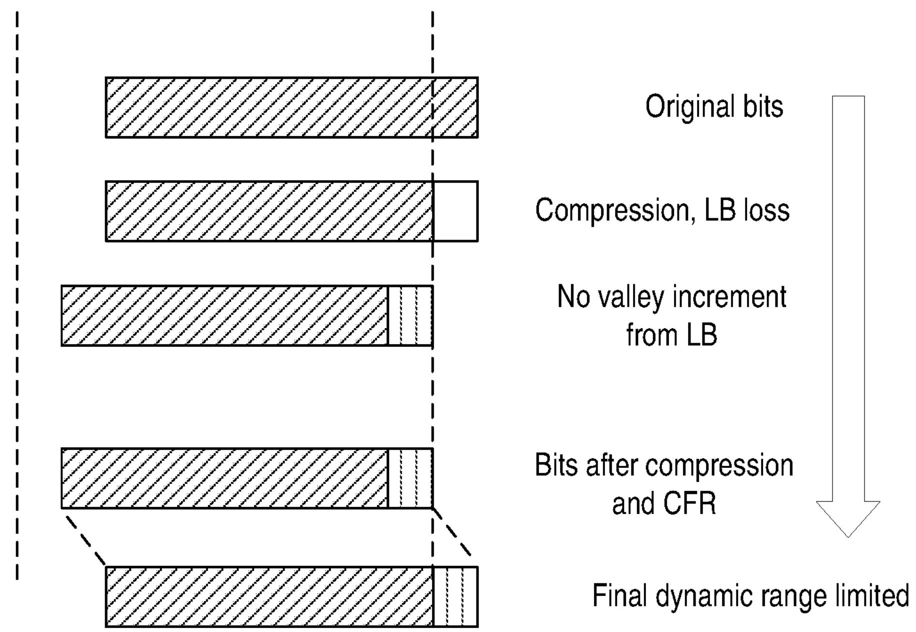
FIG. 8 shows the impact of compression and CFR on dynamic range in low power case according to an embodiment of the disclosure.

When the related control information includes an indication for indicating not to apply valley increment, the RU applies CFR on the decompressed block at block 706. As a simplest example, the CFR described in the background section may be used. Note that the present disclosure is not limited in what CFR technique is used at block 706. As described above, the DU may determine, at block 614, that valley increment is not to be applied when the maximum power is smaller than or equal to the predetermined first power threshold. Thus, block 706 corresponds to low power case. FIG. 8 shows the impact of compression and CFR on dynamic range in such low power case. As shown, due to the low power case, there is no high bit loss due to CFR. The distorted low bit by the compression carries no information and thus is not cut off due to the omission of valley increment. As a result, the final dynamic range can be increased while the distorted low bit by the compression still can secure certain EVM level.

Figure 9:
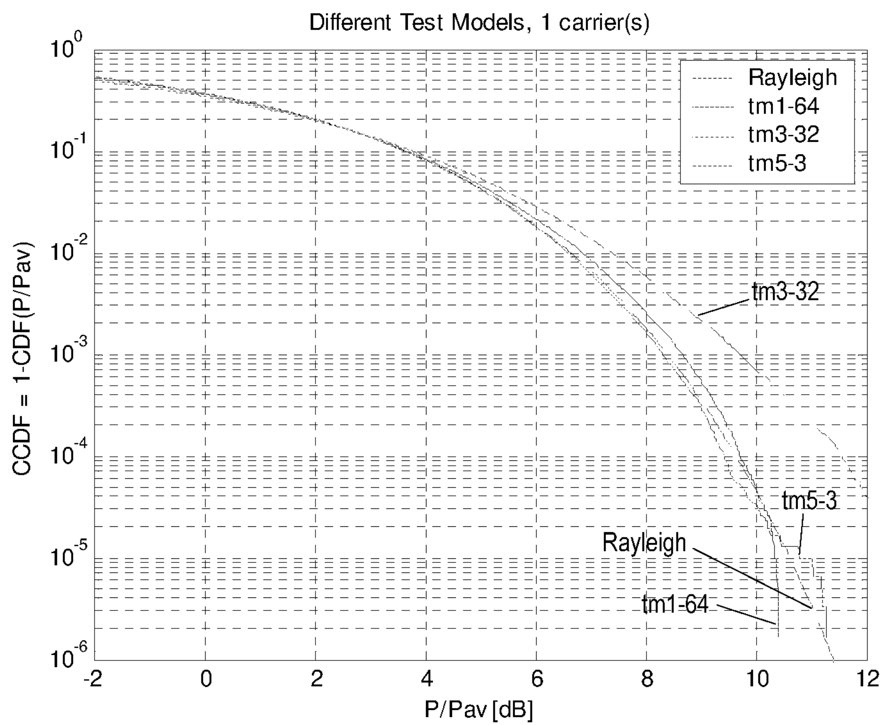
FIG. 9 shows the complementary cumulative distribution function (CCDF) of long term evolution (LTE) signals.
Figure 10:
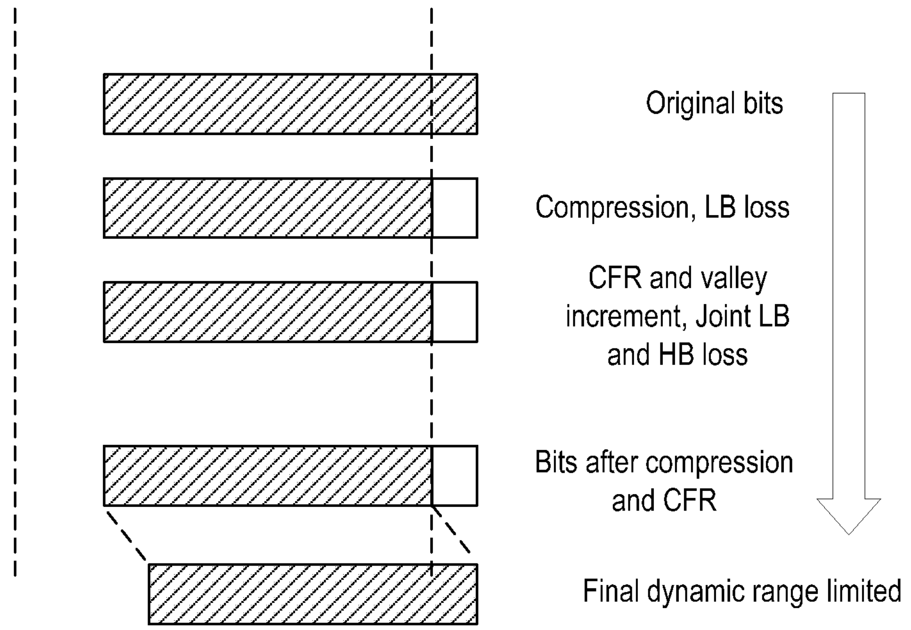
FIG. 10 shows the impact of compression and clipping on dynamic range in low power case.

The operation at block 706 is proposed because of the following considerations. Firstly, FIG. 9 shows the complementary cumulative distribution function (CCDF) vs. peak-to-average ratio (PAR) of long term evolution (LTE) signals. As shown, the input signals are the test models TM1, TM3 and TM5 as defined by the 3rd generation partnership project (3GPP). It can be seen that most of PAR is relatively lower than the high threshold for CFR. Thus, in low power case, it is possible that there is no high bit loss due to CFR. Secondly, FIG. 10 shows the impact of compression and clipping on dynamic range in low power case. As shown, because valley increment is applied, there is low bit loss due to the valley increment. Compared with FIG. 8, the signal processing flow of FIG. 10 is not efficient and actually wastes the dynamic range of signal.

On the other hand, when the related control information includes information related to bit loss due to compression by the DU, the RU applies both valley increment and CFR on the decompressed block at block 708 in such a way that the valley increment is applied based on the information related to bit loss. As an option, the information related to bit loss may be the number of lost bits due to the compression. In this case, the RU may determine a signal power corresponding to the number of lost bits and use the signal power as a second power threshold for valley increment. As another option, the information related to bit loss may be the signal power corresponding to the number of lost bits. In this case, the RU may simply use the signal power as the second power threshold for valley increment. The second power threshold may refer to the low threshold for valley increment. The RU may apply the valley increment first and then the CFR. Alternatively, the order may be reversed instead. That is, the RU may apply the CFR first and then the valley increment. Optionally, between the decompression at block 704 and the clipping (CFR at block 706, or both CFR and valley increment at block 708), upsampling may be applied on the decompressed block.

Figure 11:
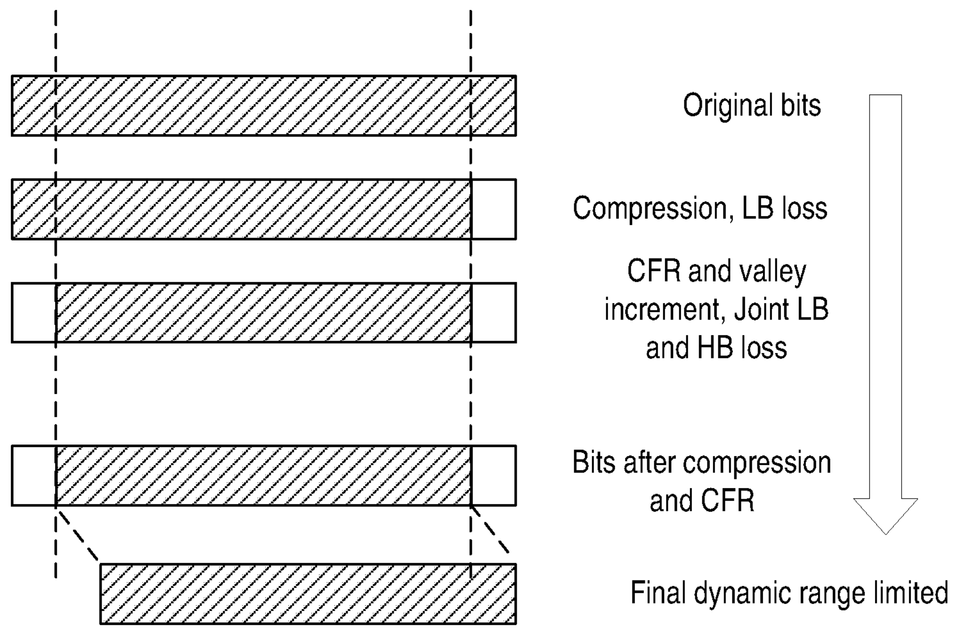
FIG. 11 shows the impact of compression and clipping on dynamic range in high power case according to an embodiment of the disclosure.

As described above, the DU may determine, at block 616, that valley increment is to be applied when the maximum power is greater than the predetermined first power threshold. Thus, block 708 corresponds to high power case. FIG. 11 shows the impact of compression and clipping on dynamic range in such high power case. As shown, since the signal power corresponding to the number of lost bits is used as the low threshold for valley increment, the EVM degradation due to compression and clipping without cooperation can be reduced. It should be noted that two blocks shown in succession in the figures may, in fact, be executed substantially concurrently, or the blocks may sometimes be executed in the reverse order, depending upon the functionality involved.

Figure 12:
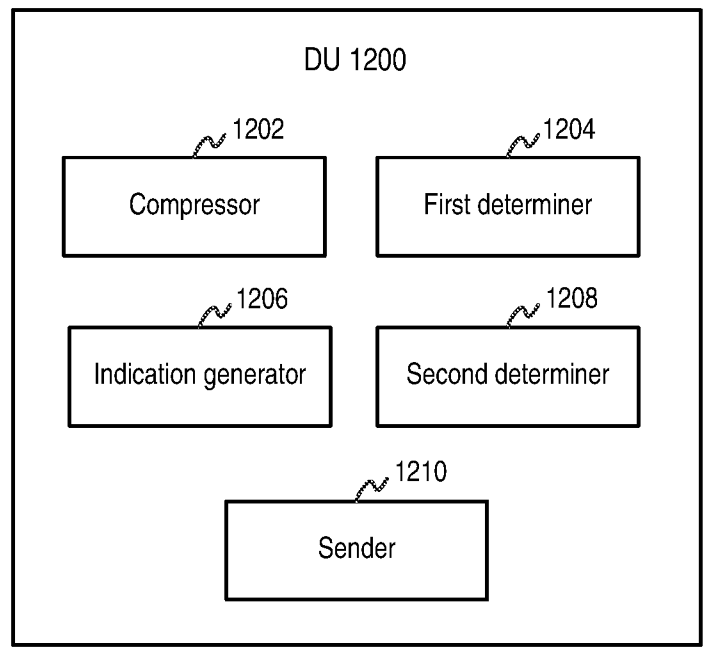
FIG. 12 is a block diagram showing a DU according to an embodiment of the disclosure.

FIG. 12 is a block diagram showing a DU according to an embodiment of the disclosure. As shown, the DU 1200 comprises a compressor 1202, a first determiner 1204, an indication generator 1206, a second determiner 1208 and a sender 1210. The compressor 1202 is configured to compress a block of baseband signal samples, as described above with respect to block 502. The first determiner 1204 is configured to determine whether valley increment is to be applied on decompressed block of baseband signal samples by a RU connected with the DU, based on the compressed block, as described above with respect to block 504. The indication generator 1206 is configured to, when the first determiner 1204 determines that valley increment is not to be applied, generate an indication for indicating not to apply valley increment, as described above with respect to block 506. The second determiner 1208 is configured to, when the first determiner 1204 determines that valley increment is to be applied, determine information related to bit loss due to the compression, as described above with respect to block 508. The sender 1210 is configured to send, to the RU, the compressed block and the indication or the information related to bit loss, as described above with respect to block 510. The above components of the DU 1200 may be implemented by a hardware circuit such as integrated circuit, field programmable gate array (FPGA), or the like.

Figure 13:
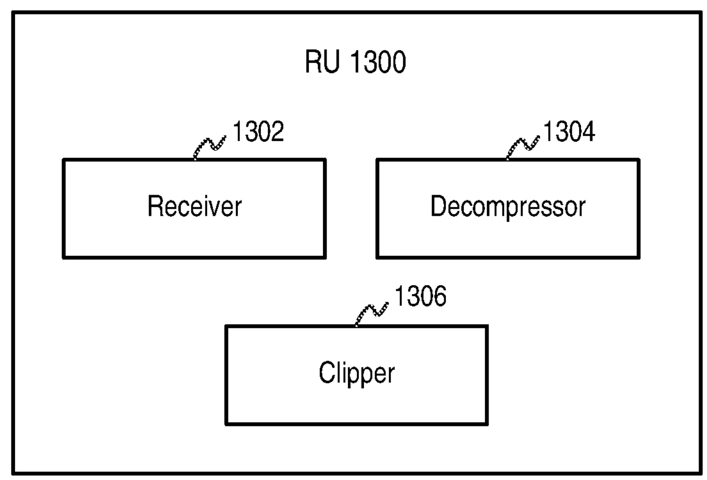
FIG. 13 is a block diagram showing a RU according to an embodiment of the disclosure.

FIG. 13 is a block diagram showing a RU according to an embodiment of the disclosure. As shown, the RU 1300 comprises a receiver 1302, a decompressor 1304 and a clipper 1306. The receiver 1302 is configured to receive a compressed block of baseband signal samples and related control information from a DU connected with the RU, as described above with respect to block 702. The decompressor 1304 is configured to decompress the compressed block, as described above with respect to block 704. The clipper 1306 is configured to apply CFR on the decompressed block when the related control information includes an indication for indicating not to apply valley increment, and to apply both valley increment and CFR on the decompressed block in such a way that the valley increment is applied based on information related to bit loss due to compression by the DU when the related control information includes information related to bit loss, as described above with respect to blocks 706 and 708. As an exemplary example, the clipper 1306 may include a valley increment subcomponent and a CFR subcomponent connected in series. When the control information indicates not to apply valley increment, a bypass subcomponent of the clipper 1306 may bypass the valley increment subcomponent such that only CFR is applied. When the control information indicates to apply valley increment, the bypass subcomponent stops working such that both valley increment and CFR are applied. Note that the clipper 1306 may have any other suitable structure instead. The above components of the RU 1300 may be implemented by a hardware circuit such as integrated circuit, field programmable gate array (FPGA), or the like.

Figure 14:
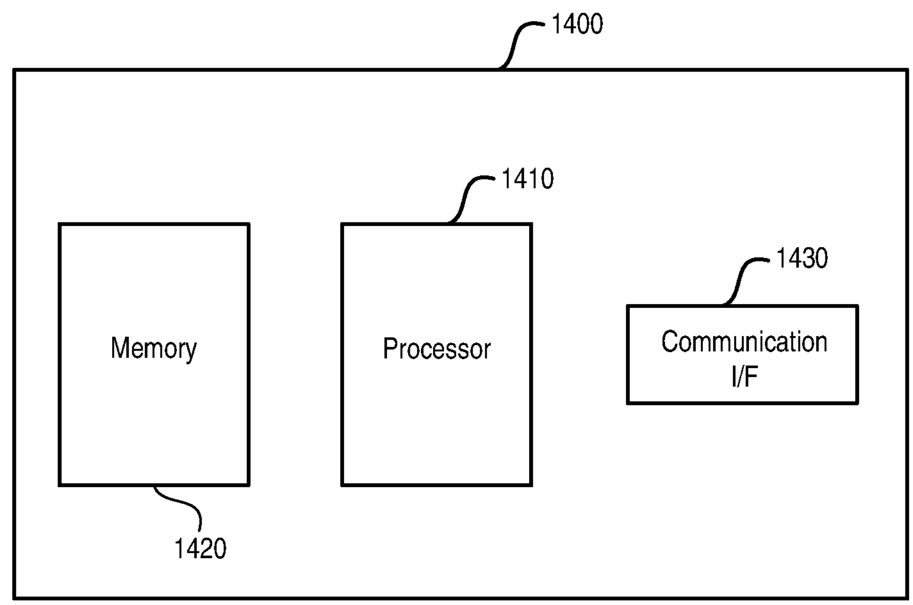
FIG. 14 is a block diagram showing an apparatus suitable for use in practicing some embodiments of the disclosure.

FIG. 14 is a block diagram showing an apparatus suitable for use in practicing some embodiments of the disclosure. For example, any one of the DU and the RU described above may be implemented through the apparatus 1400. As shown, the apparatus 1400 may include a processor 1410, a memory 1420 that stores a program, and a communication interface 1430 for communicating data with other external devices through wired and/or wireless communication.

The program includes program instructions that, when executed by the processor 1410, enable the apparatus 1400 to operate in accordance with the embodiments of the present disclosure, as discussed above. That is, the embodiments of the present disclosure may be implemented at least in part by computer software executable by the processor 1410, or by hardware, or by a combination of software and hardware.

The memory 1420 may be of any type suitable to the local technical environment and may be implemented using any suitable data storage technology, such as semiconductor based memory devices, flash memories, magnetic memory devices and systems, optical memory devices and systems, fixed memories and removable memories. The processor 1410 may be of any type suitable to the local technical environment, and may include one or more of general purpose computers, special purpose computers, microprocessors, digital signal processors (DSPs) and processors based on multi-core processor architectures, as non-limiting examples.

Figure 15:
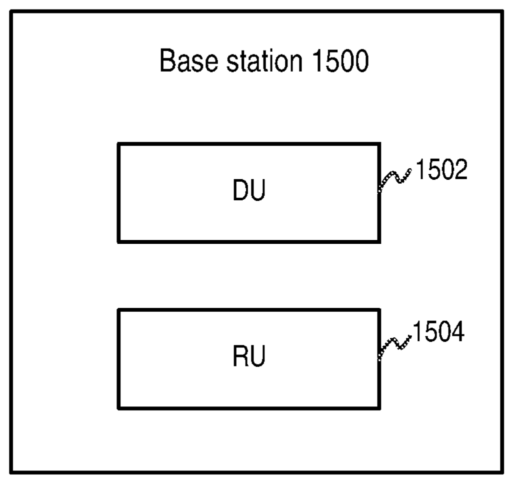
FIG. 15 is a block diagram showing a base station according to an embodiment of the disclosure.

FIG. 15 is a block diagram showing a base station according to an embodiment of the disclosure. As shown, the base station 1500 comprises a DU 1502 and a RU 1504. The DU 1502 may be implemented as described above with reference to FIG. 12 or 14. The RU 1504 may be implemented as described above with reference to FIG. 13 or 14. The other configurations of the base station may be well known to those skilled in the art and their details are omitted here.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a digital unit, DU, the method comprising:

compressing a block of baseband signal samples;

determining whether valley increment is to be applied on decompressed block of baseband signal samples by a radio unit, RU, connected with the DU, based on the compressed block;

when determining that valley increment is not to be applied, generating an indication for indicating not to apply valley increment;

when determining that valley increment is to be applied, determining information related to bit loss due to the compression; and sending, to the RU, the compressed block and the indication or the information related to bit loss.

2. The method according to claim 1, wherein the determining whether valley increment is to be applied comprises:

comparing a maximum power of the compressed block with a predetermined first power threshold;

when the maximum power is smaller than or equal to the predetermined first power threshold, determining that valley increment is not to be applied; and when the maximum power is greater than the predetermined first power threshold, determining that valley increment is to be applied.

3. The method according to claim 1, wherein the information related to bit loss is determined as:

a number of lost bits due to the compression; or a signal power corresponding to the number of lost bits.

4. The method according to claim 1, wherein the compressed block and the indication or the information related to bit loss are sent in a format based on common public radio interface, CPRI.

5. A method implemented at a radio unit, RU, the method comprising:

receiving a compressed block of baseband signal samples and related control information from a digital unit, DU, connected with the RU;

decompressing the compressed block;

when the related control information includes an indication for indicating not to apply valley increment, applying crest factor reduction, CFR, on the decompressed block; and when the related control information includes information related to bit loss due to compression by the DU, applying both valley increment and CFR on the decompressed block, wherein the valley increment is applied based on the information related to bit loss.

6. The method according to claim 5, wherein the information related to bit loss is a number of lost bits due to the compression; and wherein the valley increment is applied by determining a signal power corresponding to the number of lost bits and using the signal power as a second power threshold for the valley increment.

7. The method according to claim 5, wherein the information related to bit loss is a signal power corresponding to a number of lost bits due to the compression; and wherein the valley increment is applied by using the signal power as a second power threshold for the valley increment.

8. The method according to claim 5, wherein the compressed block and the related control information are received in a format based on common public radio interface, CPRI.

9. A digital unit, DU, comprising:

at least one processor; and at least one memory, the at least one memory containing instructions executable by the at least one processor, which is operative to:

compress a block of baseband signal samples;

determine whether valley increment is to be applied on decompressed block of baseband signal samples by a radio unit, RU, connected with the DU, based on the compressed block;

when determining that valley increment is not to be applied, generate an indication for indicating not to apply valley increment;

when determining that valley increment is to be applied, determine information related to bit loss due to the compression; and send, to the RU, the compressed block and the indication or the information related to bit loss.

10. The DU according to claim 9, wherein to determine whether the valley increment is to be applied comprises:

comparing a maximum power of the compressed block with a predetermined first power threshold;

when the maximum power is smaller than or equal to the predetermined first power threshold, determining that the valley increment is not to be applied; and when the maximum power is greater than the predetermined first power threshold, determining that the valley increment is to be applied.

11. The DU according to claim 9, wherein the information related to bit loss is determined as:

a number of lost bits due to the compression; or a signal power corresponding to the number of lost bits.

12. The DU according to claim 9, wherein the compressed block and the indication or the information related to bit loss are sent in a format based on common public radio interface, CPRI.

* * * * *